Dec. 22, 1953  F. J. SCHENKELBERGER  2,663,443
CARRIER FOR INDUSTRIAL ELEVATING TRUCKS
Filed April 18, 1951  6 Sheets-Sheet 1

INVENTOR.
FRANK J. SCHENKELBERGER
BY
Geo. B. Pitts
ATTORNEY

Dec. 22, 1953     F. J. SCHENKELBERGER     2,663,443
CARRIER FOR INDUSTRIAL ELEVATING TRUCKS
Filed April 18, 1951     6 Sheets-Sheet 2

INVENTOR.
FRANK J. SCHENKELBERGER
BY *Geo. B. Pitts*
ATTORNEY

Dec. 22, 1953  F. J. SCHENKELBERGER  2,663,443
CARRIER FOR INDUSTRIAL ELEVATING TRUCKS
Filed April 18, 1951  6 Sheets-Sheet 3
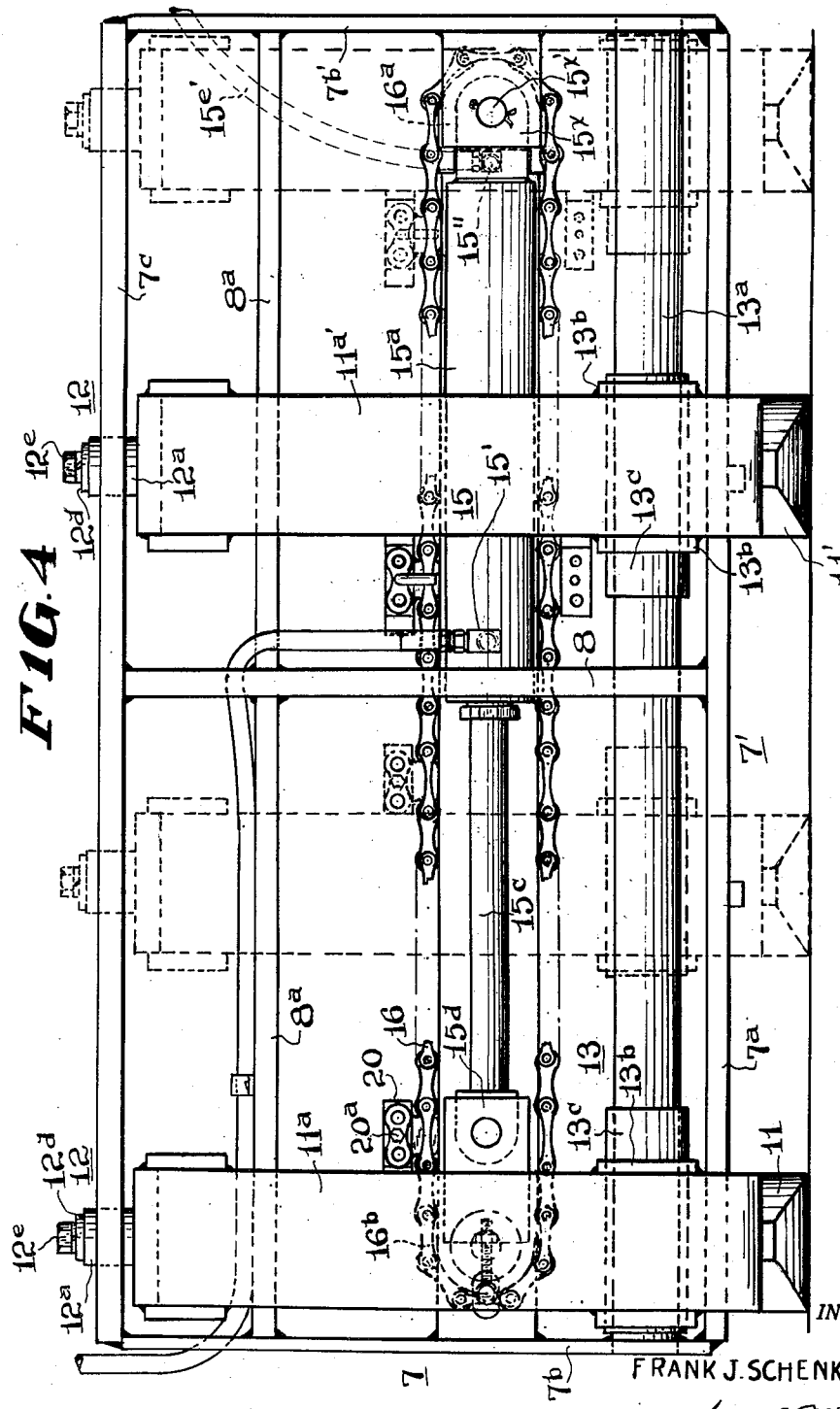
INVENTOR.
FRANK J. SCHENKELBERGER.
BY Geo. B. Pitts
ATTORNEY

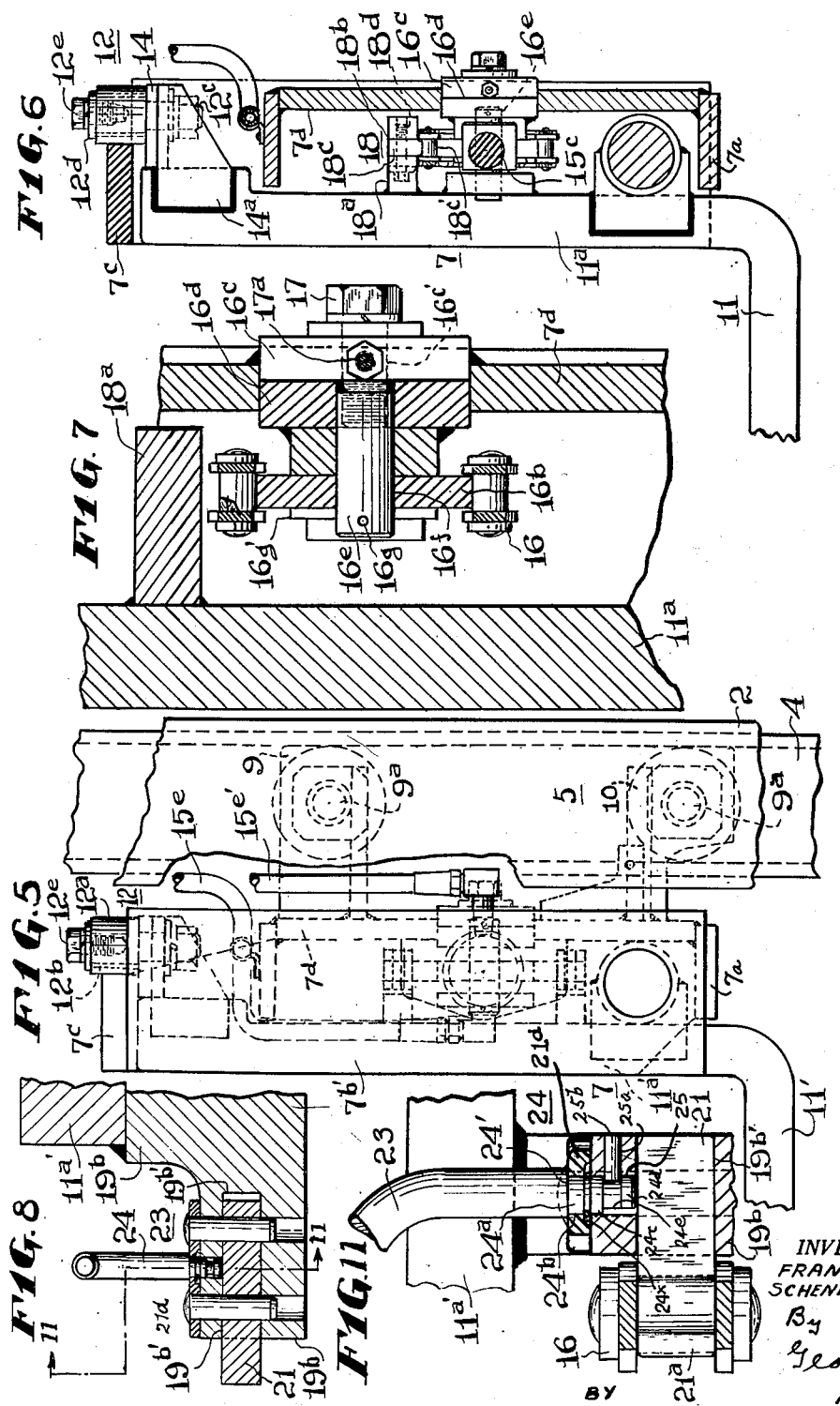

Dec. 22, 1953  F. J. SCHENKELBERGER  2,663,443
CARRIER FOR INDUSTRIAL ELEVATING TRUCKS
Filed April 18, 1951  6 Sheets-Sheet 5
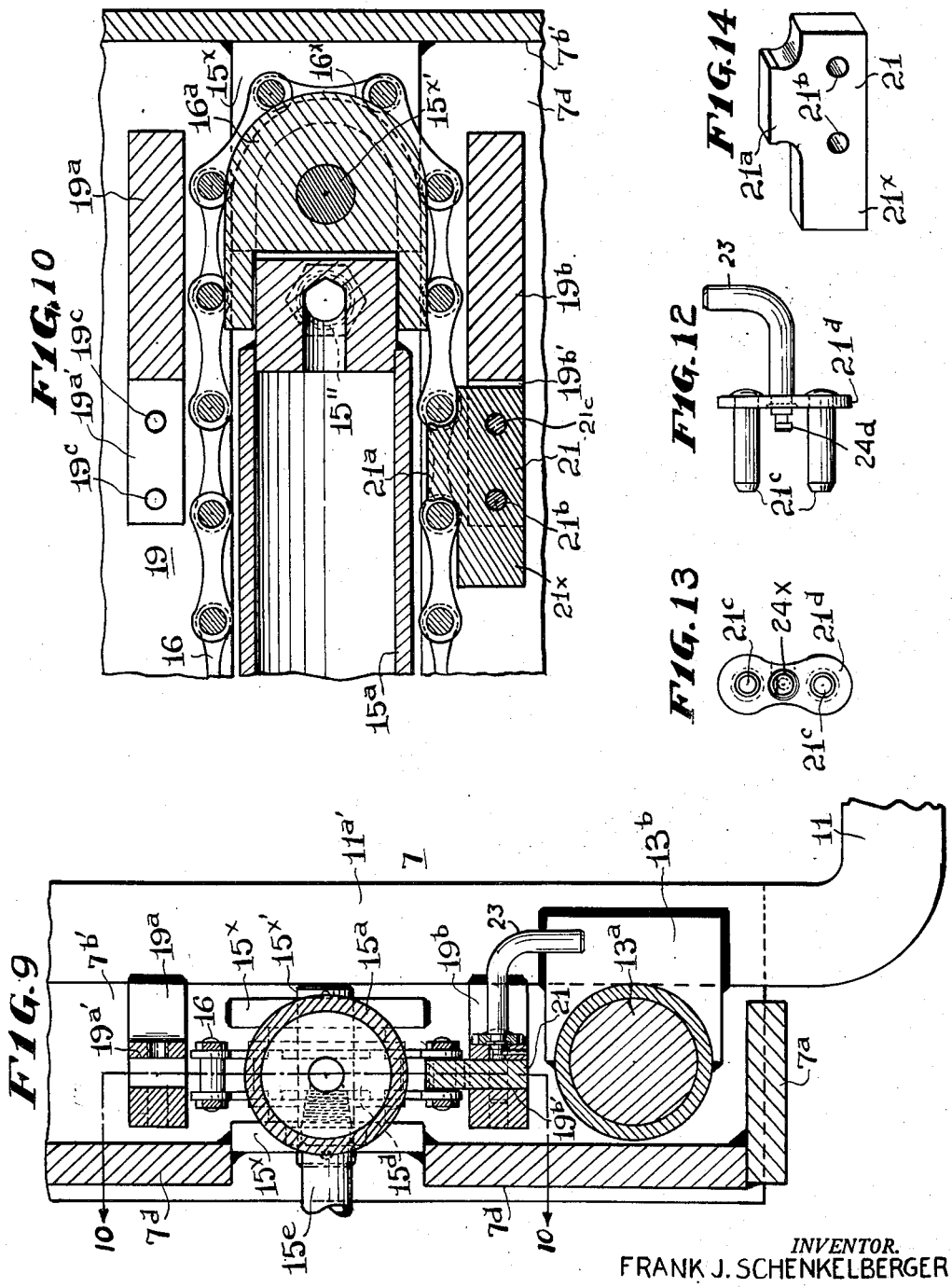
INVENTOR.
FRANK J. SCHENKELBERGER
BY
Geo. B. Pitts
ATTORNEY

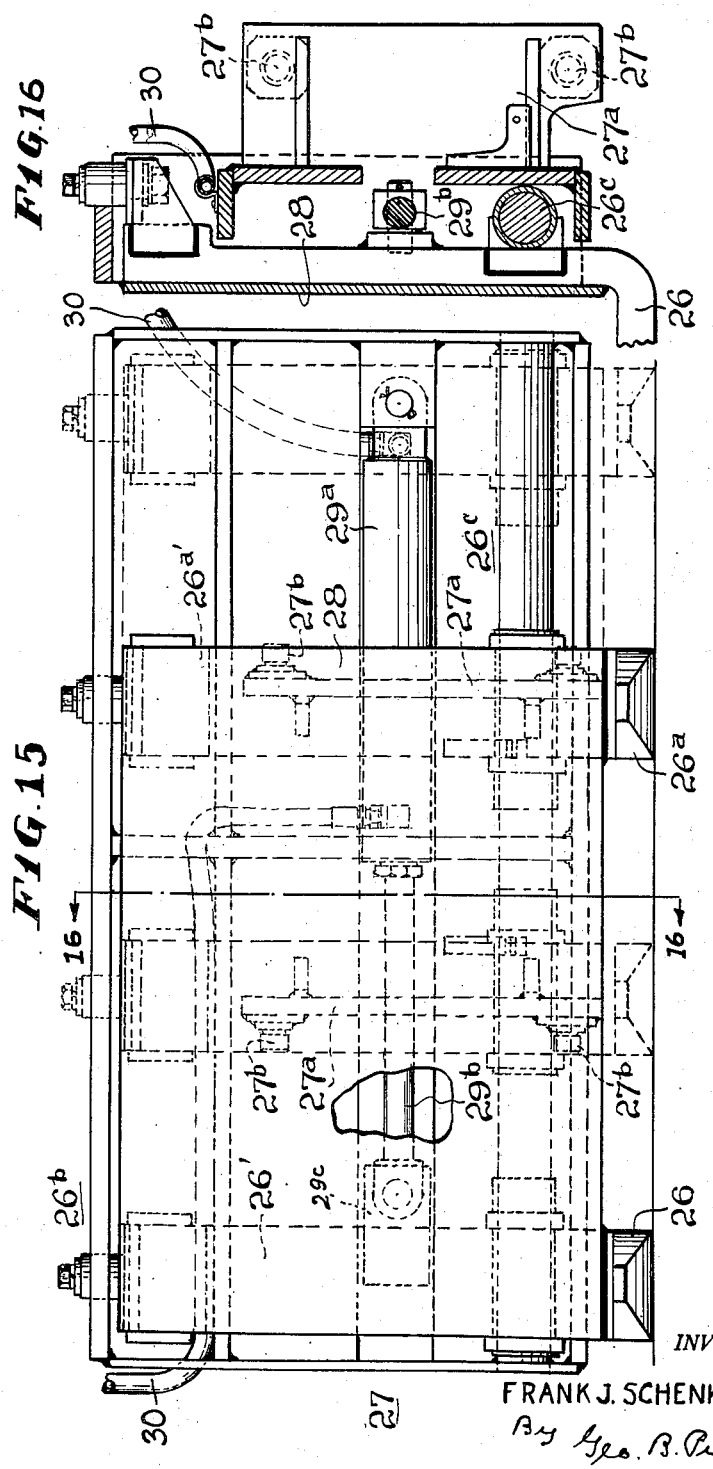

Patented Dec. 22, 1953

2,663,443

UNITED STATES PATENT OFFICE 2,663,443

CARRIER FOR INDUSTRIAL ELEVATING TRUCKS

Frank J. Schenkelberger, North Olmsted, Ohio, assignor to The Baker-Raulang Company, Cleveland, Ohio, a corporation of Ohio Application April 18, 1951, Serial No. 221,638

11 Claims. (Cl. 214—731)

This invention relates to an industrial truck of the elevating type, more particularly to the carrier therefor operable to facilitate picking up and discharging loads, whereby the latter can be stacked in close side-by-side relation, as well as one above the other, and stacked loads individually removed for transportation. The invention provides for discharging loads in close relation to upright walls, for example, the walls in freight cars, trailers and warehouses, to economize on space. The improved carrier also provides for (a) lateral movement of the load carrying members together as a unit, whereby a load, when picked up, may be moved to a stabilized position for transportation and (b) relative movement of the load carrying members to adapt the members to different sizes of loads. The movement of the load carrying members toward and from each other also provides for the picking up and handling of steel drums and other types of containers, as well as containers not supported on a pallet, skids and the like.

One object of the invention is to provide an improved load carrier mounted on the vertically movable device of an industrial truck and adapted to movably support a pair of load carrying members connected to and operated by a power unit.

Another object of the invention is to provide an improved load carrier mounted on the vertically movable device of an industrial truck, wherein the load carrying members are power operated and supported on a support for movement laterally thereof to provide for the discharge of loads in close relation to a wall or previously discharged loads.

Another object of the invention is to provide an improved carrier adapted to be mounted on the vertical movable device of an industrial elevating truck, having load carrying members and power operated means arranged to selectively move the load carrying members as a unit or relatively in opposite directions.

Another object of the invention is to provide an improved load carrier having a support mounted on the vertically movable device of an industrial truck, load carrying members mounted on the support for movement laterally thereof and power operating means therefor arranged to move the members laterally as a unit or relative to each other.

Another object of the invention is to provide an improved load carrier adapted to be connected to the raisable device on a truck, comprising a support, load carrying members on the support, power mechanism between said support and one of said members, mechanism on said support connected to the power operated member and arranged to be selectively connected to the other load carrying member to move the members one relative to the other or together as a unit.

Other objects of the invention will be apparent to those skilled in the art to which my invention relates from the following description taken in connection with the accompanying drawings, wherein Fig. 1 is a fragmentary side elevation of the front end portion of an industrial truck of the elevating type, the vertically movable device therefor supporting a carrier embodying my invention;

Fig. 3 is an elevational view of the carrier, enlarged;

Fig. 4 is a view substantially similar to Fig. 3, but showing the load carrying members in a different connected relation;

Fig. 5 is a side elevation on the line 5—5 of Fig. 3;

Figs. 6, 7, 8 and 9 are fragmentary sections on the lines 6—6, 7—7, 8—8 and 9—9, respectively, of Fig. 3;

Fig. 10 is a fragmentary section on the line 10—10 of Fig. 9;

Fig. 11 is a section on the line 11—11 of Fig. 8.

Fig. 12 is an elevational view of a key;

Fig. 13 is a section substantially on the line 13—13 of Fig. 12;

Fig. 14 is a perspective view of an anchor;

Fig. 15 is a view of a modified form of carrier; and

Fig. 16 is a section on the line 16—16 of Fig. 15.

Figure 1:
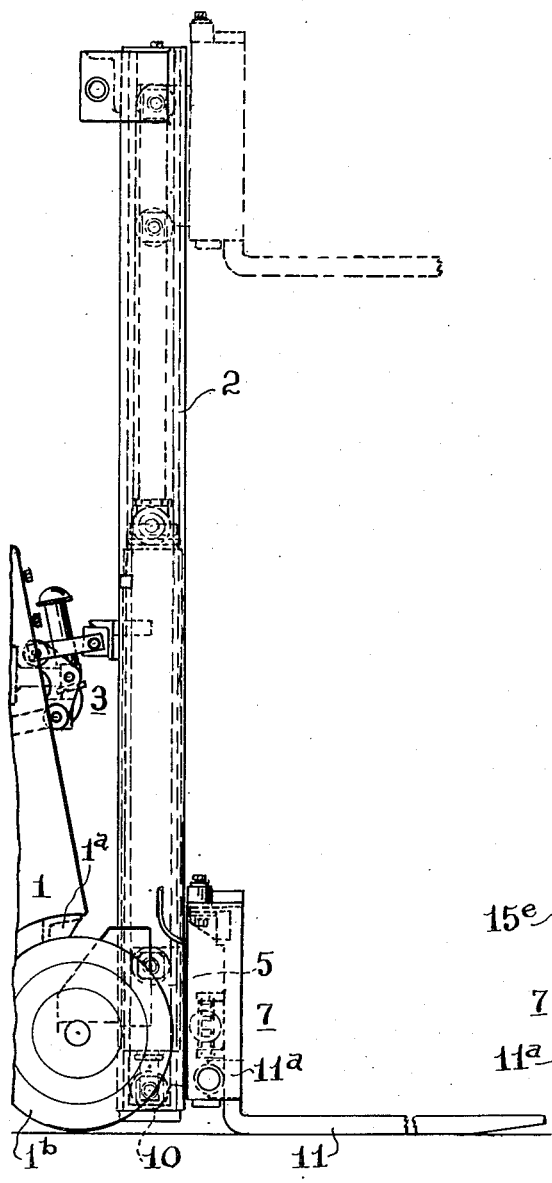
Figure 2:
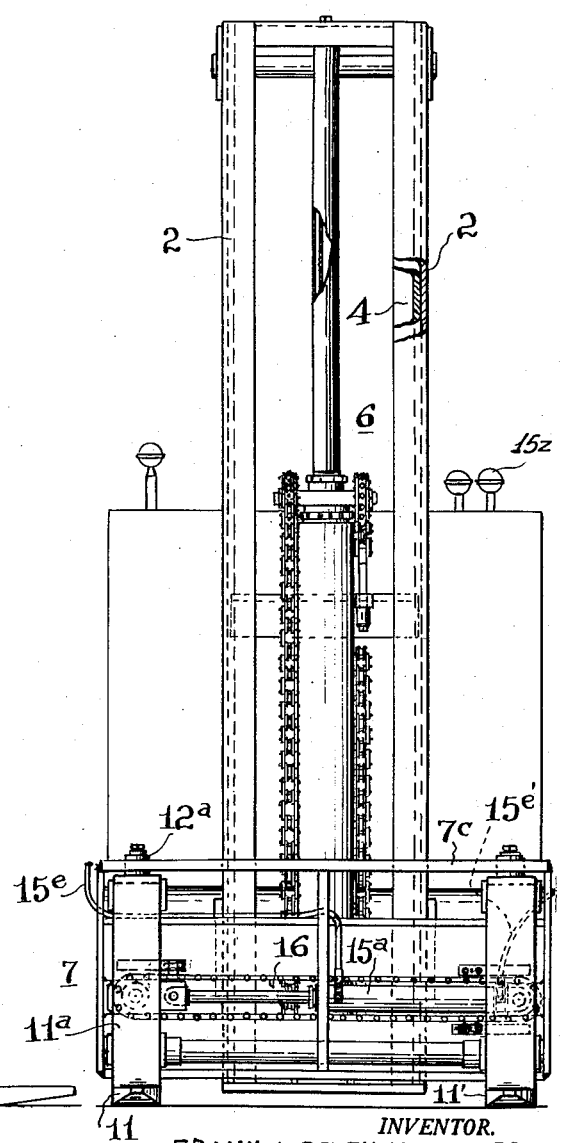
Fig. 2 is a front elevation, parts being broken away.

In the drawings, 1 indicates as an entirety the front end portion of an industrial truck having a frame 1a mounted on a pair of front wheels 1b and a pair of rear wheels (not shown), one of said pairs of wheels being driven and the other pair being steerably mounted. The frame 1a supports a pair of outer guides 2, which are mounted on trunnions, whereby, by operation of a suitable power means indicated at 3, the guides 2 and parts supported thereon may be tilted outwardly and inwardly. The guides 2 slidably support a pair of inner guides 4, relative to which a device, indicated at 5, is moved vertically by a fluid operated mechanism 6. The mechanism 6 is operable to raise the device 5 and a load carrier, indicated as an entirety at 7, to the position shown in dotted lines in Fig. 1, independently of the guides 4, and thereafter to raise both the inner guides 4 and device 5 to position the carrier at selected higher levels. The construction of the truck frame, mounting of the wheels therefor, the vertically movable device 5, guides for the latter and the raising mechanism for the device 5 above referred to form no part of the present invention and may be of any desired construction and arrangement. The form of construction of the fluid operated mechanism 6 I believe to be the invention of Max Lehmann, of East Cleveland, Ohio.

The carrier 7 comprises a frame 7' and a load support which is later referred to. The frame 7' consists of a bottom wall 7a, side walls 7b, 7b', a top wall 7c and a rear wall 7d consisting of upper and lower spaced panels, these walls being suitably welded together. The frame 7' is reinforced by a vertically disposed bar 8 welded to the top and bottom walls thereof and horizontally disposed bars 8a, 8a', the opposite ends of which are welded to the vertical bar 8 and side walls 7b, 7b'. The frame 7' may be of any desired width. The rear wall 7d is provided with rearwardly extending, parallelly related brackets 9 provided with laterally extending, upper and lower shafts 9a supporting rollers 10 (see Fig. 1), which roll on the inner guides 4 during vertical movement of the device 5 to the position shown in dotted lines in Fig. 1, in a well known manner.

The load support, as shown herein in Figs. 1 to 6, inclusive, consists of tines or forks 11, 11', connected at their inner ends to upstanding legs 11a, 11a', respectively, and each mounted on the frame 7' for movement at right angles to the guides 2. The mounting for the members 11, 11', preferably comprises upper and lower guide devices 12, 13, respectively. The devices 13 consist of the following: 13a indicates a guide member disposed adjacent the lower end of the frame 7' and suitably mounted at its opposite ends on the opposed faces of the side bars 7b, 7b'. The upstanding leg of each load carrying member 11, 11', is provided at its opposite sides with rearwardly extending supports 13b to which is connected an elongated sleeve 13c slidably fitting the guide member 13a, the sleeves on the legs 11a, 11a', being in axial alinement. The guide devices 12 consist of a roller 12a on each leg 11a, 11a', having rolling engagement with the rear side of the top wall 7c. Each roller 12a rotates on a bushing 12b which is mounted on a bolt 12c, between a washer 12d and a plate 14, the latter forming part of a U-shaped bracket 14a. The bracket 14a is fixed to the adjacent leg at the upper end thereof and extends rearwardly therefrom. The bolt 12c extends through and has threaded engagement with the walls of an opening formed in the plate 14. A cap screw 12e mounted in the upper end of the bolt 12c secures the washer 12d to the latter. As will be observed, the guide devices 12, 13, slidably support the load carrying members 11, 11', on the frame 7' in a manner which eliminates binding thereof when relatively moved or moved together as a unit, as later set forth.

The means for operating or adjusting the load carrying members 11, 11', on the guide devices 12, 13, comprise a power mechanism 15 and a movable device 16, the device 16 having separate connections with the load carrying members 11, 11', one of said connections being selective, whereby the members may be moved by the device 16, one relatively to the other, or both moved on the guides together as a unit, as later set forth. The power mechanism 15 preferably consists of a cylinder-piston unit disposed horizontally, the outer end wall of the cylinder 15a being provided with an extension supported between the outer end portions of a pair of spaced plates 15x, the opposite ends of which are suitably secured to the side bar 7b', above and spaced from the guide member 13a. The cylinder 15a is provided with a reciprocatable piston 15b, which is connected to the inner end of a rod 15c. The outer end of the rod is pivotally connected to the inner end portion of a block 15d, the outer end portion of the latter being connected to the leg 11a of the adjacent load carrying member 11 remote from the side wall 7b'. The opposite end portions of the cylinder 15a are provided with fluid connections 15', 15'', to which fluid flow pipes 15e, 15e', are connected, the latter leading to a suitable valve mechanism (not shown), which is mounted on the truck frame 1a and controlled by a lever 15'. The fluid (such as oil) is supplied under pressure in a well known manner to either pipe 15e, 15e'. By operation of the lever 15z in one direction, the oil under pressure flows through one pipe for supply to the adjacent end of the cylinder 15a to move the piston 15b toward the opposite end thereof, the oil in the cylinder being discharged through the other pipe to and through the valve mechanism to a sump (not shown); operation of the lever 15z in the opposite direction reverses the fluid connections to the cylinder 15a to move the piston 15b in the opposite direction. By preference, the fluid equipment, including the sump, pump, motor for driving the pump and valve mechanism, is of well known form of construction and is mounted on the truck frame 1a, for which reason these parts of the equipment are not shown. Those portions of the pipes 15e, 15e', leading from the fluid connections 15', 15'', consist of flexible hose to accommodate the movement of the carrier upwardly and downwardly relative to the guides 2 and frame 1a. These flexible pipe portions and contiguous portions thereof may be suitably mounted on the guides 2 in any preferred manner. The movable device 16 consists of an endless flexible member, preferably a chain, to which the legs 11a are connected, as later set forth. The chain 16 reeves about elements 16a, 16b, the element 16a being disposed between the plates 15x and secured thereto by a pin 15x' extending through alined openings formed in the plates 15x and element 16a. The element 16b is adjustably mounted on the panels forming the rear wall 7d to take up slack in the flexible member 16 in the following manner: 16c indicates a base block fitting into the space between the rear wall panels and suitably welded thereto. The inner face of the block 16c and adjacent side edges of the panels provide a guide for a slide 16d. The slide 16d is formed with an opening in which is suitably fixed a pin 16e the outer end of which extends through an opening 16f formed in the adjacent reeving element 16b, a cotter pin 16g on the outer end portion of the pin engaging a washer 16g' to secure the element 16b to the slide 16d. The slide 16d is fixed in adjusted position by a cap screw 17 extending through an opening 16c' formed in the block 16c and threaded into an opening formed in the slide 16d, the opening 16c' being elongated on an axis which intersects the axis of the path traversed by the flexible member on the reeving element 16b. The slide 16d is adjusted outwardly endwise of its guide by a screw 17a threaded through the inner side of the block 16c in line with and at right angles to the clamping screw 17 and adapted to engage the latter. In this arrangement, upon loosening the screw 17, and operation of the screw 17a to move it endwise inwardly, the slide 16d may be adjusted to take up slack in the flexible member 16, following which operation the screw 17 is tightened to secure the slide 16d in adjusted position.

The respective reeving elements 16a, 16b, may consist of sprockets, where the member 16 consists of a chain, but where a flexible member 16 of a different type is used, rollers or pulleys may be employed as reeving elements. In the use of sprockets or rollers, the pins 15x', 16e, serve as shafts therefor. I prefer to use an endless chain and to employ stationary reeving elements, as shown, each having a semi-circular outer end wall 16x (see Fig. 10), on which the cross or end bars of the links ride during movement of the chain, the inner side plates of the chain links having an overlapping relation to the opposite faces of the elements 16a, 16b, as shown in Figs. 6, 7 and 10, whereby the chain is movably supported on these elements. Preferably the cross or end bars of the chain links are provided with rollers which roll on the semi-circular end walls of the reeving elements 16a, 16b. By preference, the reeving elements 16a, 16b, are so mounted, as above set forth, that the axes of the walls 16x, about which the chain 16 reeves, are in alinement with the axis of the cylinder 15a. In this arrangement, the upper and lower runs of the chain 16 are equally spaced from and at opposite sides of the axis of the cylinder 15a and parallel to the direction of movement of the piston rod 15c.

In the form of construction shown in Figs. 1 to 14, inclusive, I provide a connection 18 between the leg 11a of the load carrying member 11 and the chain 16 and a selective connection 19 between the leg 11a' of the load carrying member 11' and the chain 16. In such arrangement, when the piston 15b is operated in either direction, the load carrying member 11 is moved or adjusted on the guide devices 12, 13, and through the chain 16 the member 11 moves the load carrying member 11' in a direction, as determined by the selective connection 19. The connection 18 consists of a plate 18a suitably fixed to the inner side of the leg 11a for the member 11 adjacent the outer side of one run of the chain 16 (preferably the upper run thereof). The plate 18a extends laterally beyond the inner side of the leg 11a and such extended portion is formed with an elongated slot 18b in which an anchor 18c is removably seated, the anchor having on its lower side a boss 18c' which extends into and fits between the end bars of a chain link; the anchor 18c in this arrangement provides a driving connection between the leg 11a and flexible member or chain 16. The anchor 18c is secured in position by a key 20, as later set forth, and by preference the key 20 is removably secured to the plate 18a by a screw 20a. This arrangement provides for disassembly of these parts in the event of breakage or other unforeseen condition. The extension on the plate 18a is provided so as to position the slot 18b where it is readily accessible and is disposed on the inner side of the leg 11a to permit maximum movement of the load carrying member 11 outwardly. To secure the anchor 18c in the slot 18b by the key 20, the extension on the plate 18a is formed with two through, parallelly related openings 18d disposed at right angles to the slot 18b and the anchor 18c is provided with two through openings adapted to register with the openings 18d, the registering openings serving to accommodate a pair of pins 20b mounted on a plate 20c and operating as a key to lock the anchor 18c to the plate 18a. From the foregoing description it will be observed that the chain 16 is connected to the anchor 18c, which in turn through the plate 18a is connected to the leg 11a of the member 11. The screw 20a extends through the plate 20c and is threaded into the extension between the pins 20b to hold the anchor in its seat and the boss 18c' in driving relation with the adjacent chain link. The connection 19 consists of separate plates 19a, 19b, suitably fixed to the inner side of the leg 11a' of the load carrying member 11' above and below the planes of the respective chain runs. Each of the plates 19a, 19b, is similar in construction to the plate 18a, the extensions thereon extending laterally beyond the inner side of the leg 11a' and formed with slots 19a', 19b', respectively. Each slot 19a', 19b', is adapted to removably receive an anchor 21, the anchor having a boss 21a adapted to removably project into the adjacent link of the chain 16, when the anchor is seated in one of said slots 19a', 19b', to connect the leg 11a' to the latter. The anchor 21 is preferably similar in construction to the anchor 18c, except that one end thereof is extended to provide a handle 21x. The anchor 21 is selectively seated in either of said slots 19a', 19b', whereby the chain and connections between the latter and the legs 11a, 11a', co-operate to move the load carrying members 11, 11', on the guides 12, 13, relatively toward or from each other or the members 11, 11', on the guide devices 12, 13, as a unit, as later set forth. The extension on each plate 19a, 19b, is formed with two through, parallelly related openings 19c disposed at right angles to the adjacent slot in the adjacent plate and the anchor 21 is formed with two through openings 21b which, when the anchor is seated in either of said slots, register with the openings 19c in the extension of the adjacent plate, the openings 19c, 21b, when in registry serving to accommodate a pair of pins 21c on a plate 21d to lock the anchor in position. The plate 21d is removably secured in position by a locking mechanism indicated as an entirety at 22.

Operation: referring to Fig. 3, it will be noted that the anchor 18c connects the leg 11a of the load carrying member 11 to a link on the upper run of the chain 16, whereas the anchor 21 connects the leg 11a' of the load carrying member 11' to the lower run of the chain 16. With the load carrying members 11, 11', disposed at their outer positions on the guide devices 12, 13, if fluid pressure is supplied to the inner end of the cylinder 15a to move the piston 15b toward the side bar 7b' (as viewed in Fig. 3), the piston will move the load carrying member 11 in the same direction and the latter through the chain 16 will move the load carrying member 11' in the opposite direction; that is, the power of the cylinder-piston unit transmitted to one of the load carrying members 11, 11', will effect a simultaneous movement of the latter toward each other, as shown in dotted lines in Fig. 3, and by reversal of the fluid pressure, supply connections to the cylinder 15a, the load carrying members 11, 11', may be simultaneously moved in the opposite direction. When the load carrying members 11, 11', are moved as above set forth they may be operated into pressure or clamping engagement with the opposite sides of steel drums, paper rolls and other types of loads as well as loads which are not supported on pallets, skids and like devices, and to raise and transport the loads and then discharge them in a rapid manner. Also, when the load carrying members 11, 11', are drivingly connected to the upper and lower runs of the chain 16, as above set forth, the load carrying members 11, 11', may be projected below a load to raise and transport it or for smaller loads the members 11, 11', may be moved toward each other into a selected spaced relation and then projected below the load to raise and transport it.

When it is desired to position the load carrying members 11, 11', for travel or movement as a unit, as shown in Fig. 4, the anchor 21 is first removed from the slot 19b' to disconnect the load carrying member 11' from the chain 16, and next, fluid pressure is supplied to the cylinder 15a to move the load carrying member 11 relative to the load carrying member 11'. If the load carrying members 11, 11', are in the position shown in full lines in Fig. 3, the load carrying member is moved toward the member 11'; on the other hand, if the load carrying members have been moved inwardly (for example, to the position shown in dotted lines in Fig. 3), and require to be spaced a greater distance, the member 11 is moved away from the member 11', the movement of the member being arrested when the desired spacing of the members is made, and thereafter the anchor 21 is seated in the slot 19a', to connect the boss 21b of the anchor 21 to a link of the upper run of the chain 16. In this latter position of the anchor 21, it will be observed that the fluid pressure supplied to the cylinder 15a will be effective to move the load carrying members 11, 11', as a unit in either direction, as shown in Fig. 4, whereby side shifting of the loads for discharge in close relation to walls and other loads may be readily carried out. Where a pick-up of a load positioned close to a wall or another load takes place, the load carrying members may be moved or shifted to a position intermediate the side bars 7b, 7b', to locate the load in a stabilized position for transportation. If the load carrying members 11, 11', are connected to the flexible member 16, as shown in Fig. 4, and it is desired to connect them to the flexible member for movement, one relative to the other, they may first be moved to the position shown in dotted lines in Fig. 4; next the anchor 21 is unlocked and removed; next the member 11 is moved to its extreme position adjacent the side bar 7b by operation of the piston unit, and finally the anchor 21 is positioned in the slot 19b' and locked therein.

The locking means 22 for the anchor 21 comprise a handle 23 and lock-and-release elements 24 between the handle 23 and the adjacent plate 19a or 19b. The key is similar in construction to the key 20. The inner end portion of the handle 23 is reduced to provide a shoulder 24' and a wall 24a (see Fig. 11) rotatably mounted in an opening 24b formed in the plate 21d of the key. Outwardly of the wall 24a the end portion of the handle is formed with an annular groove in which a split snap-ring 24x is mounted and engages the wall of an annular recess formed at the inner end of the opening 24b, the snap-ring co-operating with the shoulder 24' to connect the plate 21d and handle 23 together, while permitting the latter to be rotated. Also, outwardly of the annular groove, the end portion of the handle is formed with inner and outer spaced collars 24c, 24d, the wall between the collars and the latter collar being cut away to provide a flat 24e. The flat end portion of the handle 23 which is provided with the collars 24c, 24d, removably fits into an opening 25 formed in that portion of each plate 19a, 19b, outwardly of the adjacent anchor receiving slot and disposed at right angles thereto. That portion of each plate 19a, 19b, on the outer side of the anchor receiving slot therein is also formed with an opening 25a disposed intermediate the adjacent openings for the key pins 21c and parallel to the adjacent anchor receiving slot and intersecting the axis of the opening 25. The opening 25a is provided with a pin 25b the inner end of which extends through the opening 25 and into the space between the collars 24c, 24d. Accordingly, by turning the handle 23 to aline the flat 24e with the pin 25b, the inner end of the handle may project into the opening 25 and then rotated to the position shown in Fig. 11, whereby the handle and key are locked against removal. By rotating the handle 180 degrees the flat 24e is disposed in opposed relation to the inner end of the pin 25b and clears the latter upon removal of the handle 23. The handle 23 and key serve to removably lock the anchor 21 when the latter is positioned in either slot 19a', 19b'.

Figs. 15 and 16 illustrate a modification wherein the load carrying members 26, 26a, are fixedly connected together for travel on the upper and lower guide devices 26b, 26c, as a unit, the spacing thereof being less than the width of the carrier frame 27, whereby side shifting operations may be carried out. In this form of construction the legs 26', 26a', are connected together by a plate 28, suitably fixed to the front faces thereof, so that the plate also serves as a back for the loads. Since the load carrying members 26, 26a, are fixedly connected and move as a unit, they, in effect, constitute a single load carrying support. The frame 27 is preferably similar in construction to the frame 7' and the guide devices 26b, 26c, are similar in construction to the guide devices 12, 13, already described. The rear wall of the frame 27 is provided with rearwardly extending supports 27a, the opposite outer sides of which are provided with upper and lower laterally extending shafts 27b for rolls adapted to roll on inner guides as already set forth, the assembly of the parts referred to being similar to that shown in Fig. 5. 29 indicates the power mechanism for sliding or shifting the load carrying assembly on the guide devices 26b, 26c. This mechanism consists of a cylinder 29a provided with a reciprocatable piston, which is connected to the inner end of a piston rod 29b in a well known manner. That end of the cylinder 29a opposite to the end through which the rod 29b extends, is mounted on the adjacent end wall of the frame 27. In this arrangement, the outer end of the rod 29b is connected to a block 29c, which in turn is connected to the leg of the remote load carrying member, whereby the full stroke of the piston can be utilized to move the load carrying assembly on its guides. The outer end of the cylinder is preferably mounted on the side frame bar similarly to the corresponding end of the cylinder 15a and the outer end of the piston rod 29b is connected to the adjacent leg 26' similarly to the connections of the rod 15c to the leg 11a. The opposite ends of the cylinder 29a are connected through pipes 30, 30, with a valve controlled fluid pressure system as already set forth, whereby the piston in the cylinder may be reciprocated.

To those skilled in the art to which my invention relates, many changes in construction and widely differing embodiments and applications of the invention will be apparent without departing from the spirit and scope thereof. My disclosures herein are purely illustrative and not in any sense intended to be limiting.

What I claim is:

1. A truck for handling and transporting materials having substantially vertical guides, a device movably supported on said guides and power mechanism for raising said device, of a carrier supported on said device for movement therewith, said carrier comprising a transversely disposed frame, horizontally disposed guide means on said frame, load carrying members having legs mounted on said guide means, spaced, horizontally alined, vertically disposed reeving devices mounted on said frame, an endless flexible member arranged to reeve about said devices to provide therebetween upper and lower runs, connections between said legs and said endless member, and cylinder-piston elements disposed in a plane parallel to and between the runs of said endless member and adapted to be connected to a valve controlled fluid pressure system, one of said elements being mounted on said frame and the other element being connected to one of said legs for simultaneously moving the latter, said endless member and said other leg.

2. A truck as claimed in claim 1 wherein said guide means consist of horizontal, transversely disposed upper and lower members on said frame, alined slide elements on the rear sides of said legs intermediate their ends engaging the lower guide member, and rollers mounted on the upper ends of said legs engaging the upper guide member.

3. A truck for handling and transporting materials having substantially vertical guides, a device movably supported on said guides and power mechanism for raising said device, of a carrier supported on said device for movement therewith, said carrier comprising a transversely disposed frame, horizontally disposed guide means on said frame, load carrying members mounted on said guide means, spaced reeving devices mounted on said frame and disposed in a horizontal plane, an endless member mounted on said reeving devices, connections between said load carrying members and said endless member, and cylinder-piston elements adapted to be connected to a valve controlled fluid pressure system, one of said elements being mounted on said frame and the other element being connected to one of said load carrying members for moving the latter on said guide means, said connection between one of said load carrying members and said endless member being selective with respect to the runs of said endless member to effect movement of said members together as a unit on said guide means or relatively simultaneously toward or away from each other on said guide means.

4. A carrier adapted to be transversely mounted on the vertically movable device of an industrial truck and comprising a frame, horizontally disposed guide means on said frame, load carrying members slidably mounted on said guide means, an endless flexible member engaging reeving elements mounted on said frame adjacent its opposite ends, a connection between one of said load carrying members and said flexible member, selective connections between the other load carrying member and said flexible member, said selective connections consisting of connecting elements on said other load carrying member, each element being disposed adjacent one run of said flexible member, and a separate connecting element adapted to removably engage either of said last mentioned connecting elements and the adjacent run of said flexible member, and power mechanism connected to said frame and one of said load carrying members for moving the latter.

5. A truck as claimed in claim 4 wherein said power mechanism consists of cylinder-piston elements connected to said frame and one of said members, respectively, and fluid pressure supply connections connected to the opposite ends of said cylinder and adapted to be connected to a valve controlled fluid pressure source of supply.

6. A truck as claimed in claim 4 wherein the reeving elements consist of stationary members provided with opposite outer end walls of semicircular contour about which the flexible member slides in reeving from one run to the other run.

7. A truck as claimed in claim 5, wherein the cylinder element is mounted on said frame between the runs of said endless member.

8. A truck as claimed in claim 6 wherein one of said stationary members is adjustably mounted on said frame for adjustment on a line midway between and parallel to the runs of said endless member.

9. A truck for handling and transporting materials having substantially vertical guides, a device movably supported on said guides and power mechanism for raising said device, of a carrier supported on said device for movement therewith, said carrier comprising a transversely disposed frame, horizontally disposed guide means on said frame, load carrying members mounted on said guide means, an endless flexible member, stationary reeving elements on said frame for said flexible member, said reeving elements having opposite outer end walls of semicircular contour about which said flexible member slides, in reeving from one run to the other run thereof and said flexible member consisting of a sprocket type of chain the inner side bars of the chain links having an overlapping relation to the semi-circular end walls of said stationary reeving elements, and separate attachment means between said load carrying members and said flexible member.

10. A truck as claimed in claim 9 wherein said flexible member consists of a chain the end bars of which are provided with rollers which engage the outer end walls of said stationary reeving elements.

11. A carrier adapted to be mounted on the vertically movable device of an industrial truck and comprising a frame, horizontally disposed guide means on said frame, load engaging members having legs slidably mounted on said guide means, spaced, horizontally alined reeving members on said frame, an endless flexible member engaging said reeving members to provide upper and lower runs thereof, one of said legs being connected to one of the runs of said flexible member, connecting devices fixed to the other leg adjacent said runs, respectively, a removable anchor adapted simultaneously to engage either of said connecting devices and the adjacent run of said flexible member to connect said other leg to the latter, and fluid pressure operated cylinder-piston elements disposed parallel to the runs of said flexible member and adapted to be connected with a fluid pressure system, one of said elements being connected to said frame and the other element being connected to one of said legs.

FRANK J. SCHENKELBERGER.

References Cited in the file of this patent

UNITED STATES PATENTS

| Number | Name | Date |
|---|---|---|
| 1,813,597 | Abbe | July 7, 1931 |
| 2,318,594 | Curtis | May 11, 1943 |
| 2,360,407 | Dunham et al. | Oct. 17, 1944 |
| 2,451,943 | Gunning | Oct. 19, 1948 |
| 2,483,534 | Frischmann et al. | Oct. 4, 1949 |
| 2,522,128 | Lehmann | Sept. 12, 1950 |
| 2,561,896 | Weiss | July 24, 1951 |